US012184930B1

(12) United States Patent
Gratias

(10) Patent No.: US 12,184,930 B1
(45) Date of Patent: Dec. 31, 2024

(54) IN-FRAME VIDEO MARKERS

(71) Applicant: Amazon Technologies, Inc., Seattle, WA (US)

(72) Inventor: Brandon Gratias, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 16/179,478

(22) Filed: Nov. 2, 2018

(51) Int. Cl.
*H04N 21/44* (2011.01)
*G06V 20/40* (2022.01)
*H04N 5/272* (2006.01)
*H04N 21/2187* (2011.01)
*H04N 21/433* (2011.01)
*H04N 21/845* (2011.01)

(52) U.S. Cl.
CPC ............ *H04N 21/44* (2013.01); *G06V 20/40* (2022.01); *H04N 5/272* (2013.01); *H04N 21/2187* (2013.01); *H04N 21/4334* (2013.01); *H04N 21/8456* (2013.01)

(58) Field of Classification Search
CPC .............. H04N 21/44; H04N 21/2187; H04N 21/4334; H04N 21/8456; H04N 5/272; G06K 9/00711; G06V 20/40
See application file for complete search history.

(56) References Cited

U.S. PATENT DOCUMENTS

| 9,538,209 | B1 * | 1/2017 | Kokenos | H04N 21/4316 |
| 10,313,412 | B1 * | 6/2019 | Hall | H04L 65/80 |
| 10,362,356 | B2 * | 7/2019 | Gonzalez | H04N 21/4331 |
| 2009/0189981 | A1 * | 7/2009 | Siann | H04N 21/6181 348/143 |
| 2009/0307732 | A1 * | 12/2009 | Cohen | H04N 21/435 725/87 |
| 2011/0141359 | A1 * | 6/2011 | DiGiovanni | H04N 21/4316 348/563 |
| 2012/0316934 | A1 * | 12/2012 | Zier | H04N 21/262 705/14.4 |
| 2013/0031582 | A1 * | 1/2013 | Tinsman | H04N 21/4316 725/36 |
| 2014/0143799 | A1 * | 5/2014 | Nagorniak | H04N 21/812 725/32 |
| 2014/0149596 | A1 * | 5/2014 | Emerson, III | H04N 21/472 709/231 |
| 2014/0233413 | A1 * | 8/2014 | Dahod | H04N 21/6131 370/252 |
| 2015/0326892 | A1 * | 11/2015 | McCoy | H04N 21/23424 725/34 |
| 2016/0253710 | A1 * | 9/2016 | Publicover | H04N 21/2187 705/14.66 |
| 2017/0061504 | A1 * | 3/2017 | Phillips | G06Q 30/0277 |

(Continued)

*Primary Examiner* — Randy A Flynn
(74) *Attorney, Agent, or Firm* — Eversheds Sutherland (US) LLP

(57) ABSTRACT

Techniques are described for performing actions (e.g., streaming video content, such as advertising content) based on visual markers detected within a live video feed being streamed to one or more computing devices. First video content is streamed to the one or more computing devices. A presence of a content item within the first video content is detected at a first point in time during streaming of the first video content. An action associated with the content item is performed at a second point in time in response to detection of the presence of the content item in the first video content.

18 Claims, 8 Drawing Sheets

(56) References Cited

U.S. PATENT DOCUMENTS

2017/0150213 A1\* 5/2017 Cremer ............ H04N 21/44008
2017/0251261 A1\* 8/2017 James ................ H04N 21/2393
2018/0295415 A1\* 10/2018 Roujansky ....... H04N 21/44016
2019/0141410 A1\* 5/2019 Zverina ............ H04N 21/23418

\* cited by examiner

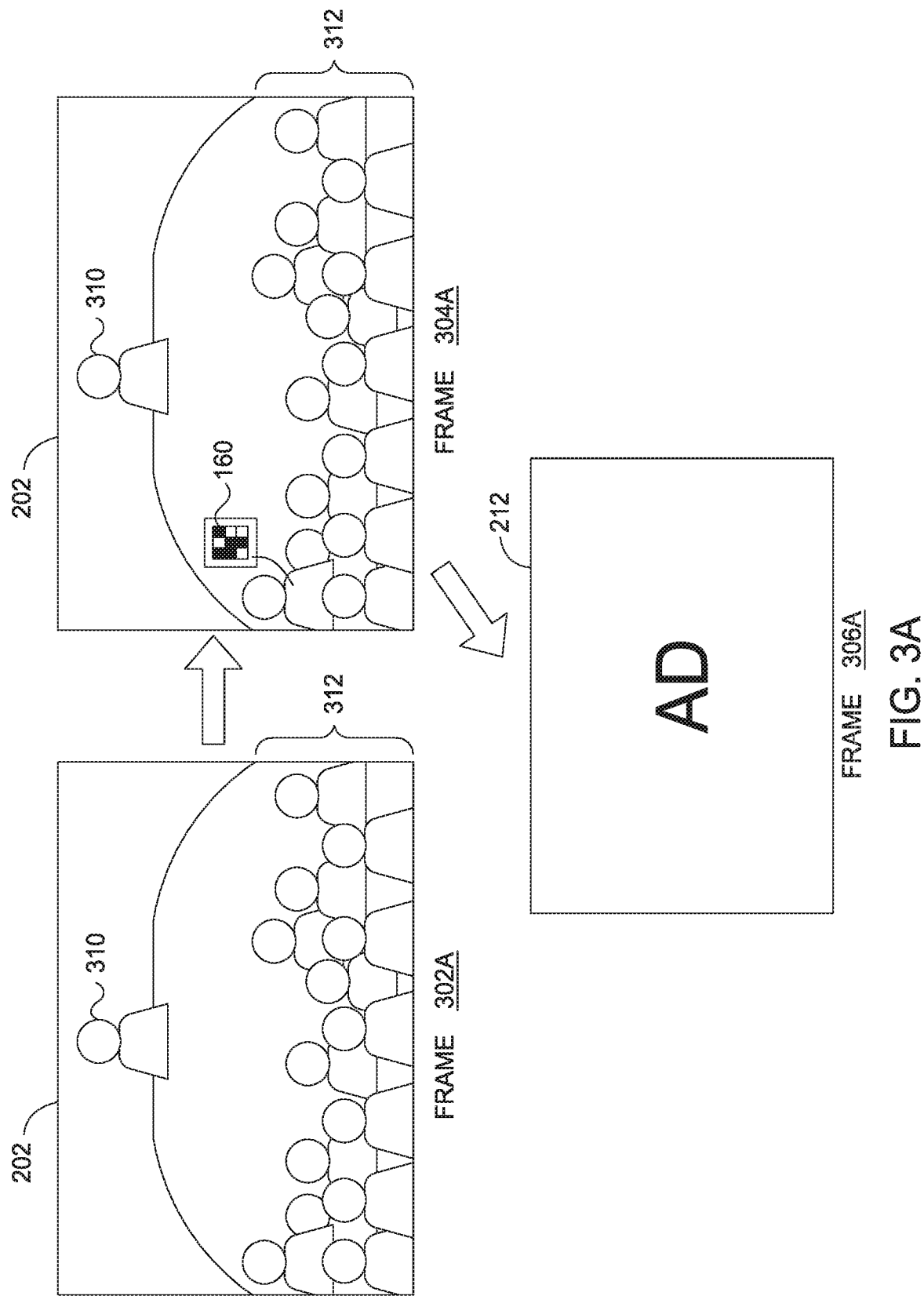

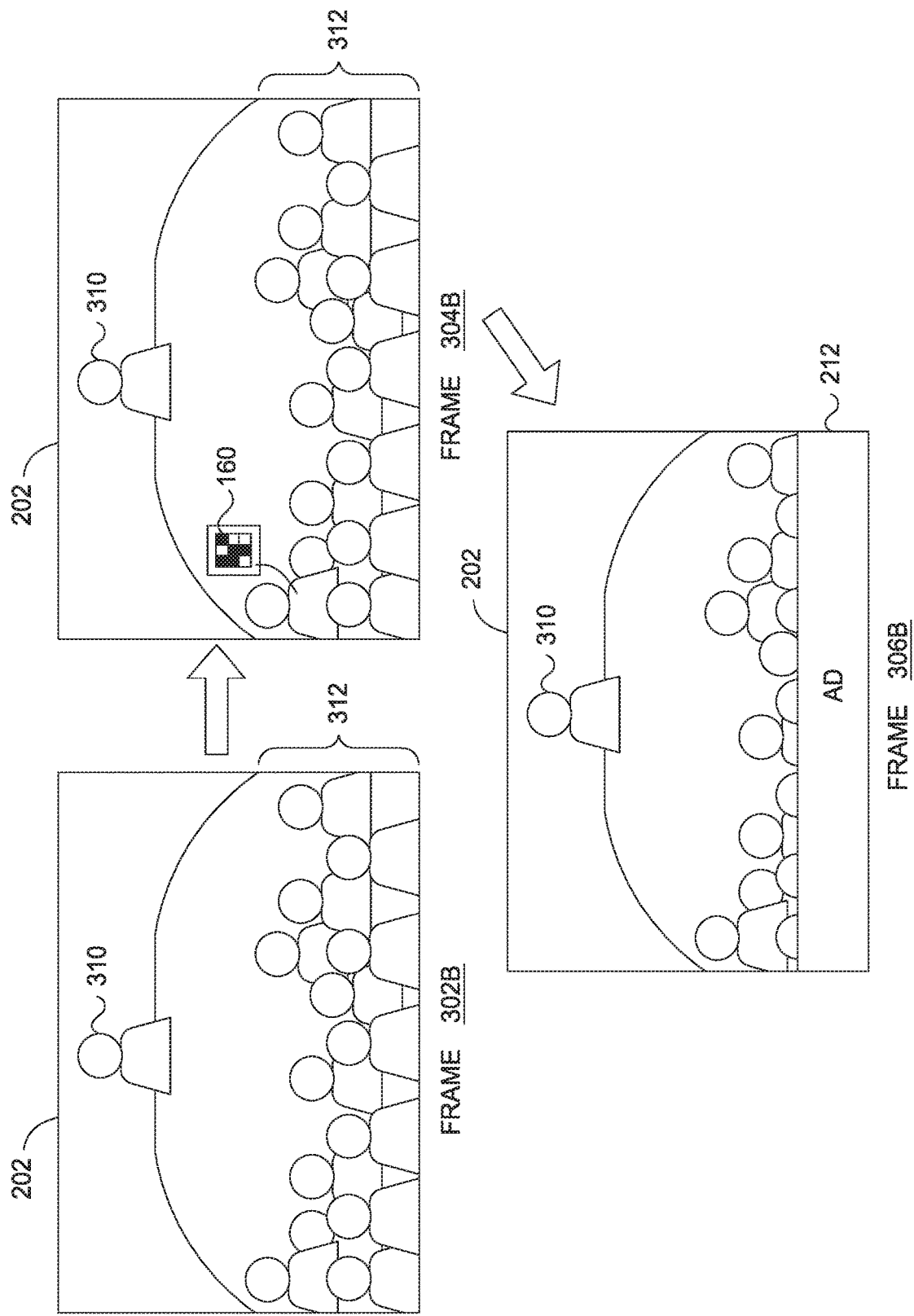

IN-FRAME VIDEO MARKERS

BACKGROUND

The present disclosure generally relates to techniques for streaming video content, and more specifically, to techniques for triggering actions, such as streaming advertising content, based on recorded objects detected within frame(s) of streamed video content.

Streaming platforms allow a user to send media over a network in real-time. For example, a user may use such streaming platforms to stream live video gaming, sporting events, concerts, interviews, theatrical plays, talk-shows, self-user videos (e.g., "selfie" videos), etc., to a wide viewing audience. A viewer can access live streamed video content through various methods, such as via a web browser on a computer, an application ("app") on a mobile phone, or platform-dedicated software on the user's computing device. Streaming platforms may also insert advertisements within live streamed video content. For example, streaming platforms may insert advertisements in live streamed video content based on advertising markers embedded in a video feed (e.g., serial digital interface (SDI) video feed, high definition multimedia interface (HDMI) video feed) that specify position and duration of the advertisements. Currently, users typically employ specialized hardware devices and/or software to insert advertisement markers within a video feed. Some users, however, may not find it cost-effective to invest in such costly equipment in order to run advertisements.

BRIEF DESCRIPTION OF DRAWINGS

FIG. 3A illustrates an example scenario of streaming video content after detecting a content trigger within video content of a video feed, according to one embodiment.

FIG. 3B illustrates another example scenario of streaming video content after detecting a content trigger within video content of a video feed, according to one embodiment.

DETAILED DESCRIPTION

Figure 1:
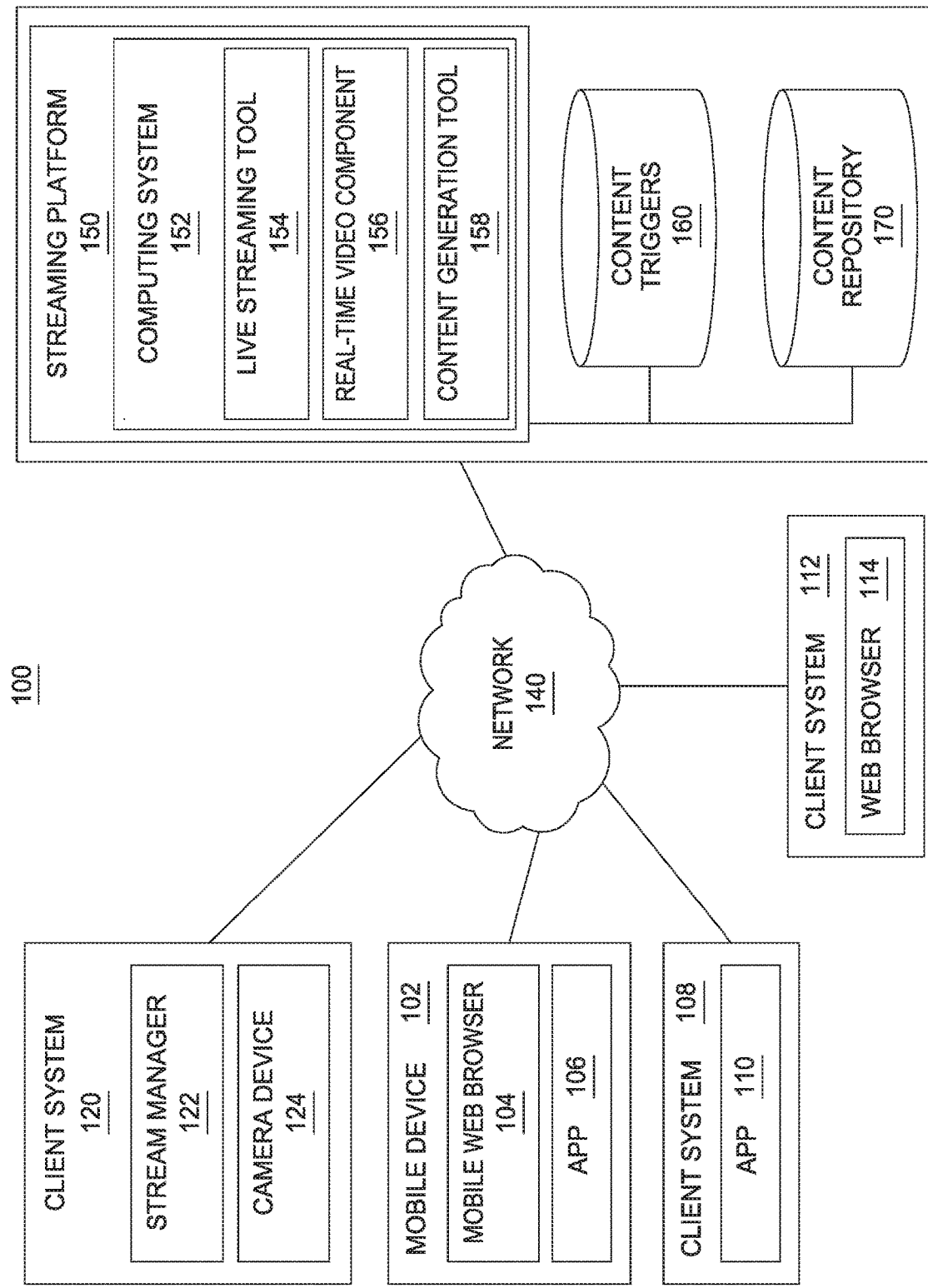
FIG. 1 is a block diagram illustrating an example of a computing environment providing a streaming platform for streaming video content over a network, according to one embodiment.

Streaming platforms generally allow content providers to stream video content to a wide-viewing audience in real-time. As a reference example, a content provider (e.g., individual(s), video broadcaster, etc.) recording a live event (e.g., sporting event) can stream the live event in real-time to multiple devices via a streaming platform. Streaming platforms may also allow content providers to run video advertisements ("ads") in streamed video content. In such cases, streaming platforms generally use ad markers received from content providers to determine the manner (e.g., time and position) in which to insert advertising content into streamed video content.

Currently, content providers generally employ specialized hardware inserters and/or customized inserter applications to embed ad markers into a live video feed (e.g., SDI video feed, HDMI video feed) being recorded. In some examples, content providers may use Society of Cable Telecommunications Engineers (SCTE) hardware inserters to add SCTE markers (e.g., SCTE-104 markers, SCTE-35 markers, etc.) into a video feed. In some examples, the SCTE markers may be added into the non-video information (e.g., horizontal ancillary data (HANC), vertical ancillary data (VANC), or other metadata) embedded within the video feed. Inserting ad markers in this manner can be complicated and cost-prohibitive to small content providers (e.g., individual users, etc.) that may not find it feasible to invest in such costly equipment in order to run ads.

As such, embodiments described herein provide techniques that enable streaming platforms to use content items detected within frame(s) of recorded video content as markers for inserting other video content (e.g., ad content) into streamed video content. One embodiment provides a streaming platform that streams first video content to first computing device(s). In some examples, the first video content may include video content from a live event (e.g., sporting event, concert, interview, etc.) being recorded and streamed to the first computing device(s) in real-time. In other examples, the first video content may include video content from a past live event that has been archived for later access (e.g., for streaming on-demand by a viewer via the first computing device(s)).

In some embodiments, the streaming platform can detect a presence of a content item within the first video content at a first point in time. The content item, for example, may include a recorded object (e.g., a set of symbols, person(s), sign, etc.) within a frame(s) of the first video content, as opposed to non-video information (e.g., VANC, HANC, etc.) or other metadata that is added to the first video content. The streaming platform can stream second video content to the first computing device(s) at a second point in time in response to detecting the presence of the content item. In this manner, embodiments can significantly reduce the cost and complexity associated with running ads during on-demand streaming and/or live streaming.

Many of the following embodiments use streaming video content (e.g., video ad content) as a reference example of a type of action the streaming platform can perform in response to detecting a particular content item within recorded video content. However, embodiments herein can perform other types of actions, such as refraining from streaming recorded video content, triggering adjustment of playback settings (e.g., audio/visual settings) of the recorded video content, etc., in response to detecting a particular content item within recorded video content. Additionally, the following references a streaming platform generally used by a content provider to stream video content (e.g., sporting events, concerts, live video gaming competitions, talk shows, interviews, selfie-videos, theatrical performances, etc.) in real-time. Such reference is used as an example streaming platform that may interrupt streamed video content to insert other video content (e.g., video ad content) in response to detecting particular content items within recorded video content received from a content provider.

However, one of ordinary skill in the art will recognize that embodiments presented herein may be adapted for a variety of streaming media services. Further, many of the following embodiments use ad content as a reference example of other video content that may be inserted into streamed video content. However, embodiments herein can also be used to trigger the insertion of other video content different from ad content (e.g., a video feed of another live event, an emergency video broadcast, regional blackout, etc.).

FIG. 1 is a block diagram illustrating a computing environment 100 providing a streaming platform for streaming video over a network, according to one embodiment. As shown, the computing environment 100 includes a streaming platform 150, mobile device 102, and client systems 108, 112, 120, each interconnected via a network 140. The network 140, in general, may be a wide area network (WAN), local area network (LAN), wireless LAN (WLAN), personal area network (PAN), a cellular network, etc. In a particular embodiment, the network 140 is the Internet. Client systems 108, 112, 120 are representative of a variety of computing devices, including a desktop computer, laptop computer, mobile computer (e.g., a tablet or a smartphone), digital media player, video game console, smart television, etc. Mobile device 102 is representative of a variety of computing devices, such as a mobile telephone, smartphone, computing tablet, etc.

The streaming platform 150 allows a content provider, via client system 120, to send live video to a wide audience of viewers in real-time (e.g., as the content provider records the event). As shown, client system 120 includes a stream manager 122 and camera device 124. Camera device 124 enables the content provider to record an event, e.g., in real-time. The stream manager 122 provides an interface for the content provider to access the streaming platform 150. In particular, the stream manager 122 is configured to capture the recorded video input of the camera device 124 and send the recorded video input in real-time to the streaming platform 150. In some embodiments, the stream manager 122 can transcode the recorded video input into compressed video content using a video codec (e.g., H.264, High Efficiency Video Coding (HEVC) or H.265, etc.), and send the compressed video content to streaming platform 150.

The streaming platform 150 includes a computing system 152, content triggers 160, and video content repository 170. As shown, the computing system 152 includes a live streaming tool 154, real-time video component 156, and content generation tool 158. In one embodiment, streaming platform 150 may be located in a cloud environment. The live streaming tool 154 receives recorded video data sent by the stream manager 122, transcodes the video data into multiple streams (e.g., video streams), and distributes the streams to geographically disparate nodes of a content delivery network (CDN) for on-demand access by users of the streaming platform 150. In one example, a viewer may access the streaming platform 150 via web browser 114 on client system 112. In one example, a viewer may access the streaming platform 150 via an application 110 executing on client system 108. In one example, a viewer may access the streaming platform 150 via mobile web browser 104 and/or application 106 executing on mobile device 102. The web browser 114, applications 106, 110, and mobile web browser 104 may directly interface with a content delivery component (provided by the live streaming tool 154). The content delivery component may allow the viewer to search for a live video event, archived video event, and/or content provider, and view various streamed video content. In response to a request for a particular live video event, the live streaming tool 154 may stream video content of the live video event to viewer(s) (e.g., via client systems 108, 112, mobile device 102, etc.) in real-time (e.g., as the live event is being recorded). Similarly, in response to a request for a particular archived video event, the live streaming tool 154 may stream video content of the archived video event to viewer(s) (e.g., via client systems 108, 112, mobile device 102, etc.).

In one embodiment, the streaming platform 150 may allow content providers to run ads during streamed video content. That is, a content provider may trigger the streaming platform 150 to interrupt streamed video content and stream different video content (e.g., ad content) by inserting one or more content triggers 160 into the visual field-of-view of the camera device 124 (on client system 120) recording an event. The content triggers 160 may include recordings of persons or physical objects that are captured by the camera device 124. For example, the physical objects can include inanimate physical objects, such as a set of symbols (e.g., a matrix barcode, such as a Quick Response (QR) code), sign, rock, chair, book, vehicle, etc. In some embodiments, the physical objects can include animate physical objects, such as an animal, person, plant, etc. In general, however, the content triggers 160 may include any collection of physical objects (e.g., a particular person wearing a particular piece of clothing, such as a costume).

In some embodiments, each content trigger 160 may have a predefined association with a particular type of video content. For example, a first content trigger (e.g., first matrix barcode) may be associated with a first type of video ad content (e.g., a video ad for a car manufacturer), a second content trigger (e.g., second matrix barcode) may be associated with a second type of video ad content (e.g., a video ad for a clothing product), and so on. In some embodiments, each content trigger 160 may have a predefined association with a particular video content source. For example, different content triggers 160 may be associated with video ads from different geographical regions, different durations, etc. In some embodiments, each content trigger 160 may have a predefined association with a different time interval. For example, a first content trigger may trigger the streaming platform 150 to stream video ad content after a first amount of time (e.g., fifteen seconds) has elapsed after detection of the first content trigger, a second content trigger may trigger the streaming platform 150 to stream video ad content after a second amount of time (e.g., one minute) has elapsed after detection of the second content trigger. In general, however, each content trigger 160 may have a predefined association with one or more of the following: a particular type of video content, position of the video content, duration of the video content, video content source, and time interval. The streaming platform 150 may send an indication of the content triggers 160 to content providers that later use streaming platform 150 to send live video content to viewer(s).

In one embodiment, the real-time video component 156 monitors recorded video input received from the client system 120 for a content trigger 160. The real-time video component 156 may determine the type of video content and/or the manner (e.g., position, duration, etc.) in which to stream the video content to viewers based on the content trigger. Once the real-time video component 156 detects a content trigger 160, the real-time video component 156 uses content generation tool 158 to retrieve video content corresponding to the content trigger 160 (e.g., from content repository 170). In one embodiment, the content generation tool 158 is an ad server that fetches ad content from content repository 170. In this embodiment, the real-time video component 156 can trigger a call to the ad server (e.g., to fetch the ad content) upon detecting the content trigger 160.

The live streaming tool 154 streams the video content (e.g., video ad content) received from the content generation tool 158 to the viewers. In one embodiment, the live streaming tool 154 can stream the video content received from the content generation tool 158 and video content received from the client system 120 at the same time. Assuming the live streaming tool 154 receives ad content from the content generation tool 158, the live streaming tool 154 can overlay the ad content over the streamed video content (received from the client system 120). As a reference example, the live streaming tool 154 may run the ad content over a bottom portion of the streamed video content. In this example, the ad content may appear (e.g., to a viewer) as a banner running at the bottom of an interface of the viewer's computing device while the video content is in progress. In one embodiment, the position of the ad content that is overlaid over the streamed video content may be determined based on the content trigger 160 associated with the ad content. For example, the content trigger 160 may indicate that the ad content is to cover the top fourth of the streamed video content, the bottom fourth of the streamed video content, etc.

In another embodiment, the live streaming tool 154 can switch from streaming the video content (received from the client system 120) to stream the video content received from the content generation tool 158. Assuming the video content received from the content generation tool 158 is ad content, the live streaming tool 154 may resume the streamed video content after the duration of the ad content. As noted, in some embodiments, the streaming platform 150 can archive video streams of past events, e.g., for later access by viewers. In such embodiments, when streaming archived video content, the streaming platform 150 can interrupt the streamed video content after detecting a content trigger in the archived video content.

In some embodiments, the streaming platform 150 can be configured to perform other types of actions, e.g., different from streaming video content, in response to detecting a content trigger 160 within streamed video content. In one reference example, the streaming platform 150 can stop (or refrain from) streaming video content received from the client system 120. In one reference example, the streaming platform 150 can trigger mobile device 102 and client systems 108, 112 to adjust one or more playback settings (e.g., audio mixer level, etc.) of the streamed video content. In one embodiment, each content trigger 160 has a pre-defined association with a type of action.

Note that while FIG. 1 depicts the streaming platform 150 with a single computing system 152, in some embodiments, the streaming platform 150 may include multiple computing systems 152. Similarly, although FIG. 1 depicts the live streaming tool 154, real-time video component 156, and content generation tool 158 as being within a single computing system 152, the live streaming tool 154, real-time video component 156, and content generation tool 158 may be distributed across multiple computing systems 152 within streaming platform 150.

Figure 2:
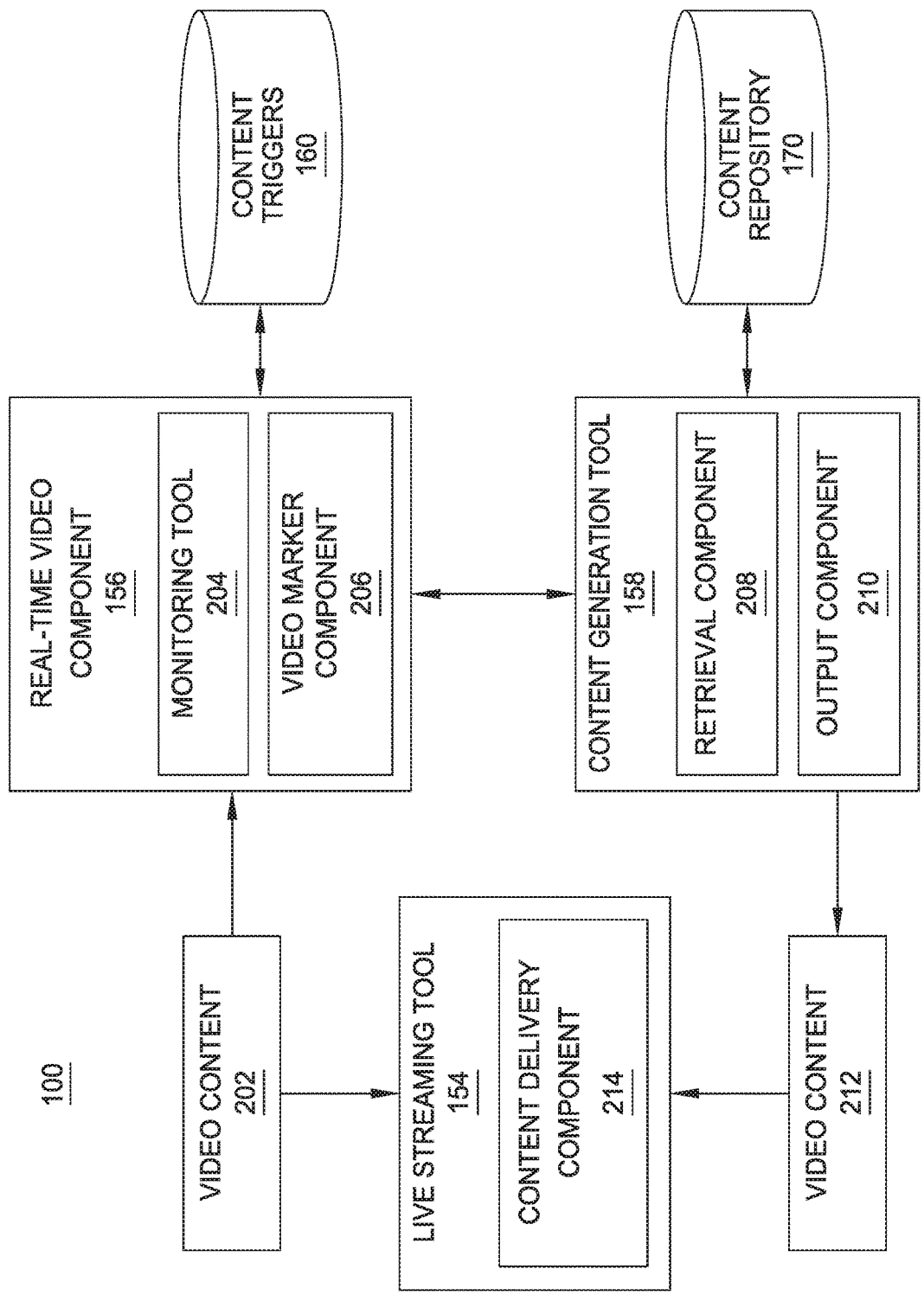
FIG. 2 is a block diagram further illustrating components of the streaming platform illustrated in FIG. 1, according to one embodiment.

FIG. 2 is a block diagram further illustrating components of the streaming platform 150 described relative to FIG. 1, according to one embodiment. As shown, the live streaming tool 154 receives video content 202 (e.g., from client system 120). In one embodiment, video content 202 may include recorded video content being sent to the streaming platform 150 in real-time (e.g., during recording of a live event). In one embodiment, video content 202 may include recorded video content of a prior live event that is archived in streaming platform 150 for later access by viewers. In some embodiments, video content 202 may include a data stream (or bitstream) that is sent to the live streaming tool 154 using a transport protocol (e.g., Real-time Streaming Protocol (RTSP), Real-time Transport Protocol (RTP), Real-time Transport Control Protocol (RTCP), etc.).

The live streaming tool 154 uses content delivery component 214 to send the video content 202 to one or more viewers (e.g., via client systems 108, 112, mobile device 102, etc.). For example, the content delivery component 214 can send the video content 202 to viewer(s) using a transport protocol, such as RTSP, RTP, RTCP, HyperText Transfer Protocol (HTTP) Live Streaming (HLS), etc. Assuming HLS is used, the content delivery component 214 can transcode video content 202 into multiple video streams at different bandwidths and different resolutions, e.g., for adaptive streaming of the video content 202 to viewer(s).

As shown, the real-time video component 156 receives video content 202 and uses monitoring tool 204 to determine whether a content trigger 160 is present in the video content 202. In some embodiments, the monitoring tool 204 may monitor for the content trigger(s) 160 continuously (e.g., every frame). In some embodiments, the monitoring tool 204 may monitor for the content trigger(s) 160 based on other frame intervals (e.g., every second frame, third frame, and so on). As noted, the content trigger 160 may include any recorded physical object captured by the camera device 124, as opposed to non-video information (e.g., HANC, VANC, etc.) added to the video content 202.

Once the real-time video component 156 detects a content trigger 160, the real-time video component 156 uses video marker component 206 to determine a type of action to perform based on the detected content trigger 160. For example, each content trigger 160 may be associated with at least one of: (1) a type of video content to stream to viewers; (2) a content source associated with the video content; (3) a duration of the video content; (4) when to stream the video content; and (5) a position of the video content.

The streaming platform 150 uses content generation tool 158 to fetch video content (e.g., video content 212) corresponding to the detected content trigger 160. As shown, the content generation tool 158 includes a retrieval component 208 and output component 210. The retrieval component 208 fetches video content 212 corresponding to the content trigger 160 from content repository 170 and the output component 210 forwards the video content 212 to the live streaming tool 154.

In one embodiment, the content generation tool 158 is an ad server that operates in accordance with an ad serving protocol, such as Video Ad Serving Template (VAST). For example, the content generation tool 158 can receive an ad call (e.g., VAST request) from the real-time video component 156 requesting ad content corresponding to the detected content trigger 160. The content generation tool 158 may send a response (e.g., VAST response) containing the requested ad content to the live streaming tool 154.

The live streaming tool 154 uses the content delivery component 214 to stream the video content 212 to the viewers (e.g., via client systems 108, 112, mobile device 102, etc.). In some embodiments, the content delivery component 214 can use a transport protocol, such as RTSP, RTP, RTCP, HLS, etc., to stream the video content 212 to viewers.

In one embodiment, the content delivery component 214 may switch from streaming video content 202 to streaming video content 212, and resume streaming video content 202 after a duration of the video content 212. By way of example, FIG. 3A shows a series of frames 302A, 304A, and 306A of two sources of video content, 202 and 212. The video content 202 includes a presenter 310 and an audience 312, as shown in a first frame 302A and second frame 304A. Upon analysis, the streaming platform 150 may determine that a content trigger 160 is absent from the video content 202 in the first frame 302A. Subsequently, the streaming platform 150 detects a content trigger 160 within the video content 202 in the second frame 304A. Here, the content trigger 160 is a sign being held up by a member of the audience 312. In response to detecting the content trigger 160, the streaming platform 150 switches from streaming the video content 202 to streaming the video content 212 (e.g., ad content) in a third frame 306A. Although not shown, the streaming platform 150 may resume streaming the video content 202 after a duration of the video content 212.

In one embodiment, the content delivery component 214 may stream the video content 212 in addition to streaming the video content 202. By way of example, FIG. 3B shows a series of frames 302B, 304B, and 306B of two sources of video content, 202 and 212. Similar to FIG. 3A, the video content 202 includes a presenter 310 and an audience 312, as shown in the first frame 302B, second frame 304B, and third frame 306B. Upon analysis, the streaming platform 150 may determine that a content trigger 160 is absent from the video content 202 in the first frame 302B. Subsequently, the streaming platform 150 detects a content trigger 160 within the video content 202 in the second frame 304B. Similar to FIG. 3A, here the content trigger 160 is a sign being held up by a member of the audience 312. In response to detecting the content trigger 160, the streaming platform 150 begins streaming video content 212 in addition to the video content 202 in the third frame 306B. As shown, in one embodiment, the video content 212 may be displayed (e.g., as a banner) on top (e.g., over a bottom portion) of the video content 202 as an overlay.

In some embodiments, the streaming platform 150, upon detecting a content trigger 160 within the video content 202, may refrain from streaming frames of the video content 202 showing the content trigger to viewers, e.g., for an improved user experience. In this embodiment, the streaming platform 150 may buffer frame(s) of the video content 202 to allow for sufficient analysis of the frame(s) and detection of the content trigger 160. Once the content trigger is detected, the streaming platform 150 may switch from the video content 202 to the video content 212 at a transition point selected to avoid streaming any frame(s) containing the content trigger 160. In this manner, the streaming platform 150 can provide a better quality experience for viewers when streaming video content, e.g., compared to an experience in which the viewer is able to see the content trigger within the streamed video content.

Figure 3C:
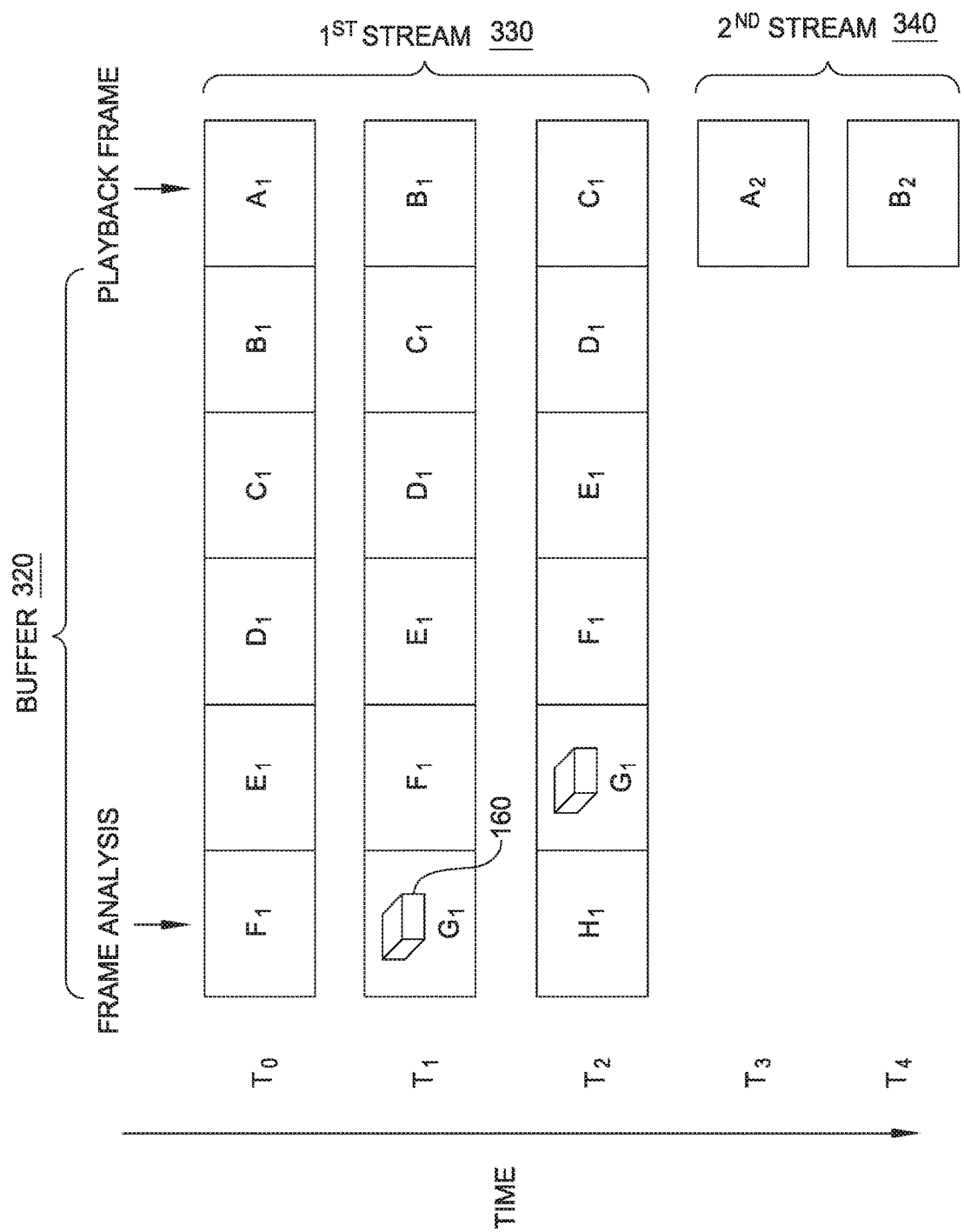
FIG. 3C illustrates another example scenario streaming video content after detecting a content trigger within video content of a video feed, according to one embodiment.

FIG. 3C shows an example scenario in which the streaming platform 150 refrains from streaming frame(s) of video content that include a content trigger 160, according to one embodiment. Here, the streaming platform 150 maintains a buffer 320 of a subset of frames of a first video stream 330 (e.g., video content 202) being received from a content provider to allow for analysis of the frames and detection of a content trigger 160. For example, at a first time instance $T_0$, the streaming platform 150 streams playback frame $A_1$ of the first video stream 330 and analyzes frame $F_1$ of the first video stream. At a second time instance $T_1$, the streaming platform 150 streams playback frame $B_1$ of the first video stream 330 and analyzes frame $G_1$ of the first video stream.

In response to detecting content trigger 160 within frame $G_1$, the streaming platform 150 determines a transition point (e.g., time instance $T_3$) to begin the transition to the second video stream 340 (e.g., video content 212). For example, as shown, the streaming platform 150 streams frames $A_2$ and $B_2$ of the second video stream 340 at respective time instances $T_3$ and $T_4$. The streaming platform 150 may avoid buffering frames of the second video stream 340. By enabling the streaming platform 150 to avoid streaming content triggers that are detected within recorded video content, embodiments can provide a seamless viewing experience for viewers and provide content providers with a cost-effective method for triggering ads during streaming.

As noted, in some embodiments, rather than stream video content 212 in response to detecting a content trigger 160, the streaming platform 150 can perform other actions, such as stopping the streaming of video content 202, triggering mobile device 102 and client systems 108, 112 to adjust playback settings of video content 202, etc. In one reference example, the real-time video component 156, in response to detecting a content trigger 160 associated with adjusting playback settings of the video content 202, can send an indication of the playback settings (e.g., audio mixer level) to one of the client systems 108, 112, triggering the client systems 108, 112 to adjust the video content 202 to the indicated playback settings.

Figure 4:
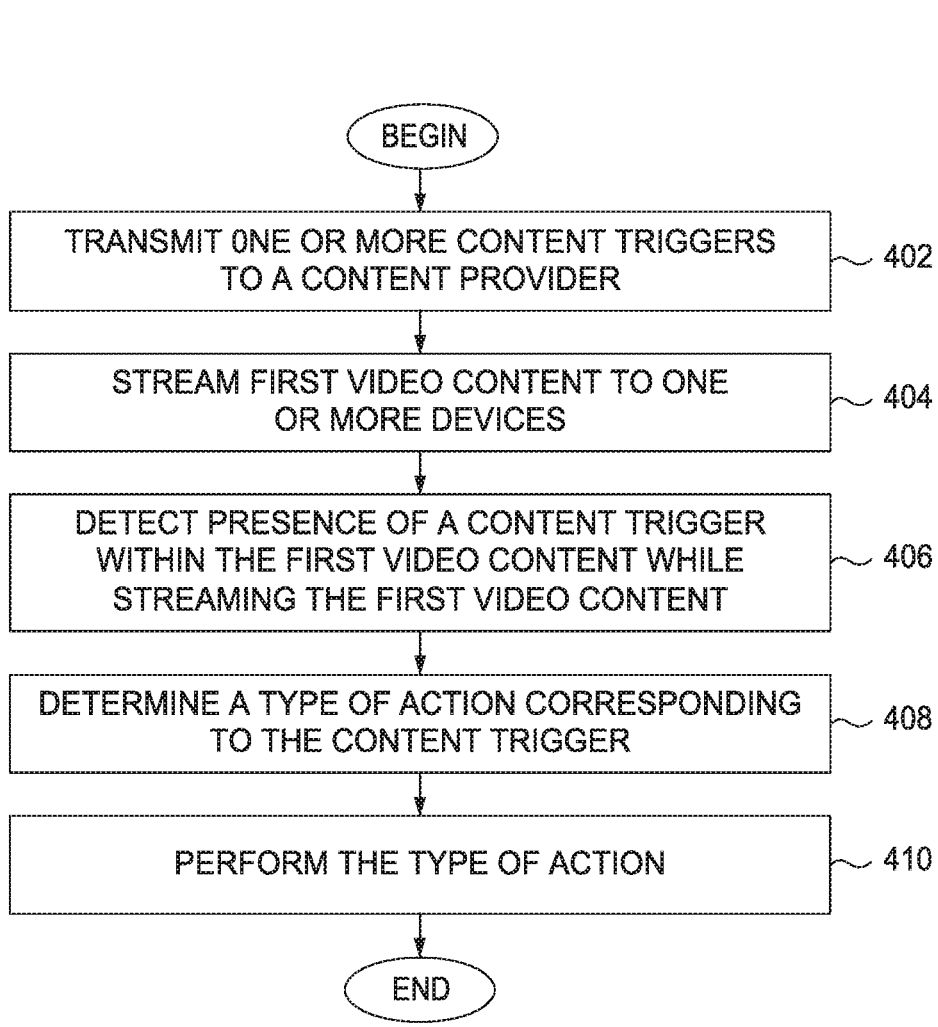
FIG. 4 is a flow chart illustrating a method for performing an action upon detecting a content trigger in streamed video content, according to one embodiment.

FIG. 4 is a flow chart illustrating a method 400 for performing an action upon detecting a content trigger in recorded video content, according to one embodiment. The method 400 may be performed by the streaming platform 150.

The method 400 begins at block 402, where the streaming platform 150 transmits one or more content triggers to a content provider. That is, the streaming platform 150 indicates content trigger(s) 160 the content providers can use to trigger streaming of video content (e.g., ad content) to viewers.

At block 404, the streaming platform 150 streams first video content to one or more devices. In one embodiment, the first video content may be associated with a live video feed being recorded (e.g., by camera device 124) and sent to the streaming platform 150. In one embodiment, the first video content may be associated with video content stored in a database located in the streaming platform 150. For example, in this embodiment, the first video content may have been previously recorded and archived for later access by one or more viewers.

At block 406, the streaming platform 150 detects a presence of a content trigger (e.g., one of content triggers 160) within the first video content. In one embodiment, the content trigger may include a recording of a physical object within the first video content that is captured by the camera device 124. That is, the content trigger that is detected is distinct from non-video information (e.g., SCTE markers or other metadata) added to the video content. At bock 408, the streaming platform 150 determines a type of action corresponding to the content trigger. For example, the content trigger may correspond to one of several different types of actions, examples of which include streaming second video content, adjusting playback of the first video content, etc.

At block 410, the streaming platform 150 performs the type of action. In one embodiment, the streaming platform 150 streams second video content in response to detecting the presence of the content trigger. The second video content, for example, may include ad content. In one embodiment, the streaming platform 150 may stream the second video content in addition to the first video content. For example, the streaming platform 150 may stream the second video content over a portion of the first video content. In one embodiment, the streaming platform 150 may switch from streaming the first video content to streaming the second video content, and resume streaming the first video content after a duration of the second video content. In one embodiment, the streaming platform 150 may refrain from streaming the first video content in response to detecting the presence of the content trigger. For example, the streaming platform 150 can prevent one or more of the mobile device 102 and client systems 108, 112 from accessing the streaming platform via mobile web browser 104, applications 106, 110, and web browser 114. In this example, the streaming platform 150 can prevent access to the streaming platform by such devices for a predefined amount of time or an amount of time associated with the content trigger. In one embodiment, the streaming platform 150 can trigger one or more of the mobile device 102 and client systems 108, 112 to adjust playback settings for the first video content in response to detecting the presence of the content trigger. For example, the streaming platform 150 can send an indication of the playback settings associated with the content trigger to the mobile device 102 and client systems 108, 112 to trigger the adjustment.

Figure 5:
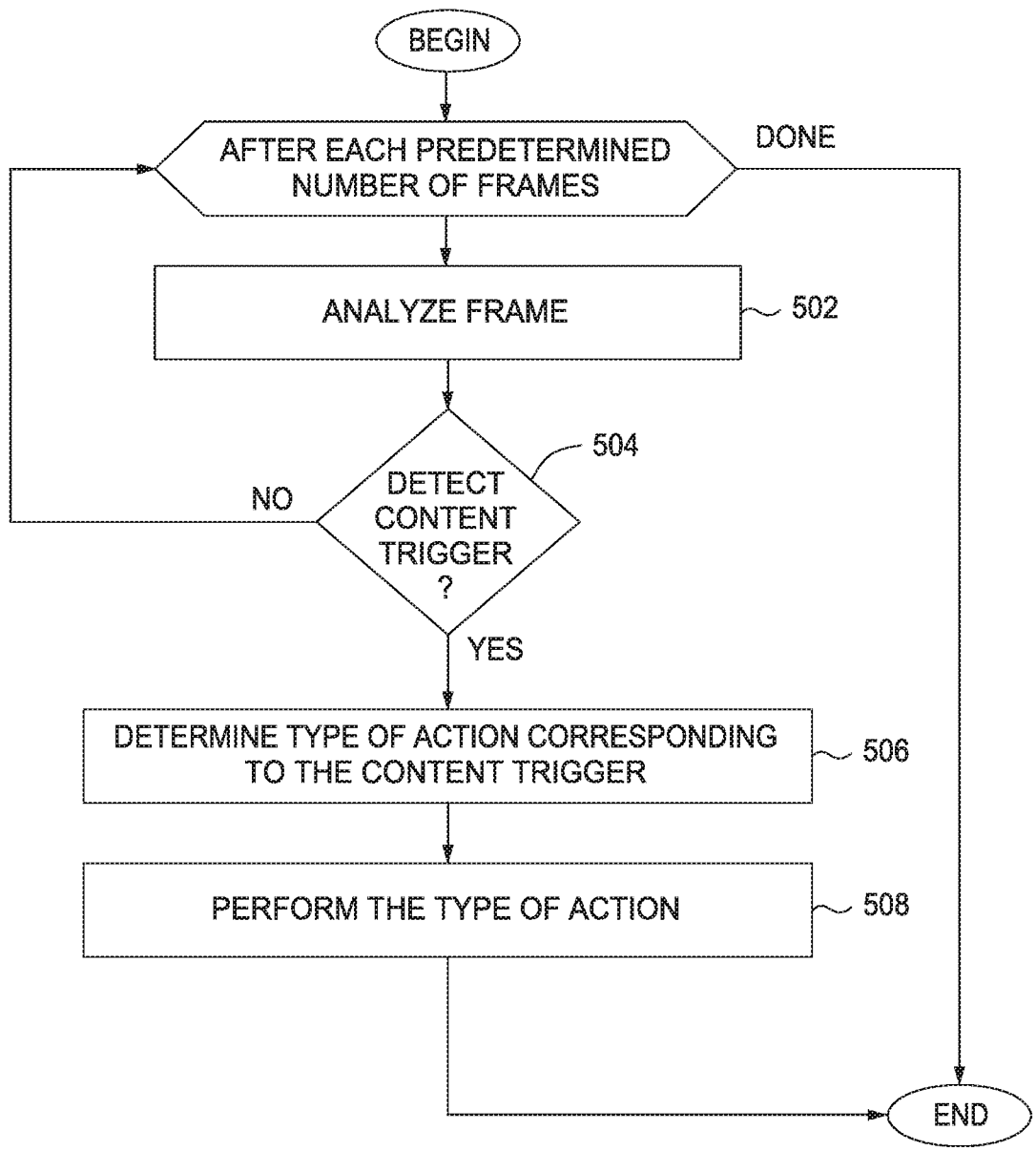
FIG. 5 is a flow chart illustrating a method for monitoring video content for a content trigger, according to one embodiment.

FIG. 5 is a flowchart illustrating a method 500 for monitoring video content for a content trigger, according to one embodiment. The method 500 may be performed by the streaming platform 150.

The method 500 begins at block 502, where the streaming platform 150 analyzes a frame of the (first) video content after a predetermined number of frames. In one embodiment, the streaming platform 150 analyzes each frame of the video content. In one embodiment, the streaming platform 150 can analyze frames of the video content based on another frame interval (e.g., after every second frame, third frame, fourth frame, etc.). At block 504, the streaming platform 150 determines whether a content trigger is present within the frame. If not, the streaming platform 150 proceeds to analyze the subsequent frame (e.g., at block 502) after the predetermined number of frames have elapsed. If the content trigger is detected, the streaming platform 150 determines a type of action corresponding to the content trigger (block 506) and performs the type of action (block 508).

Figure 6:
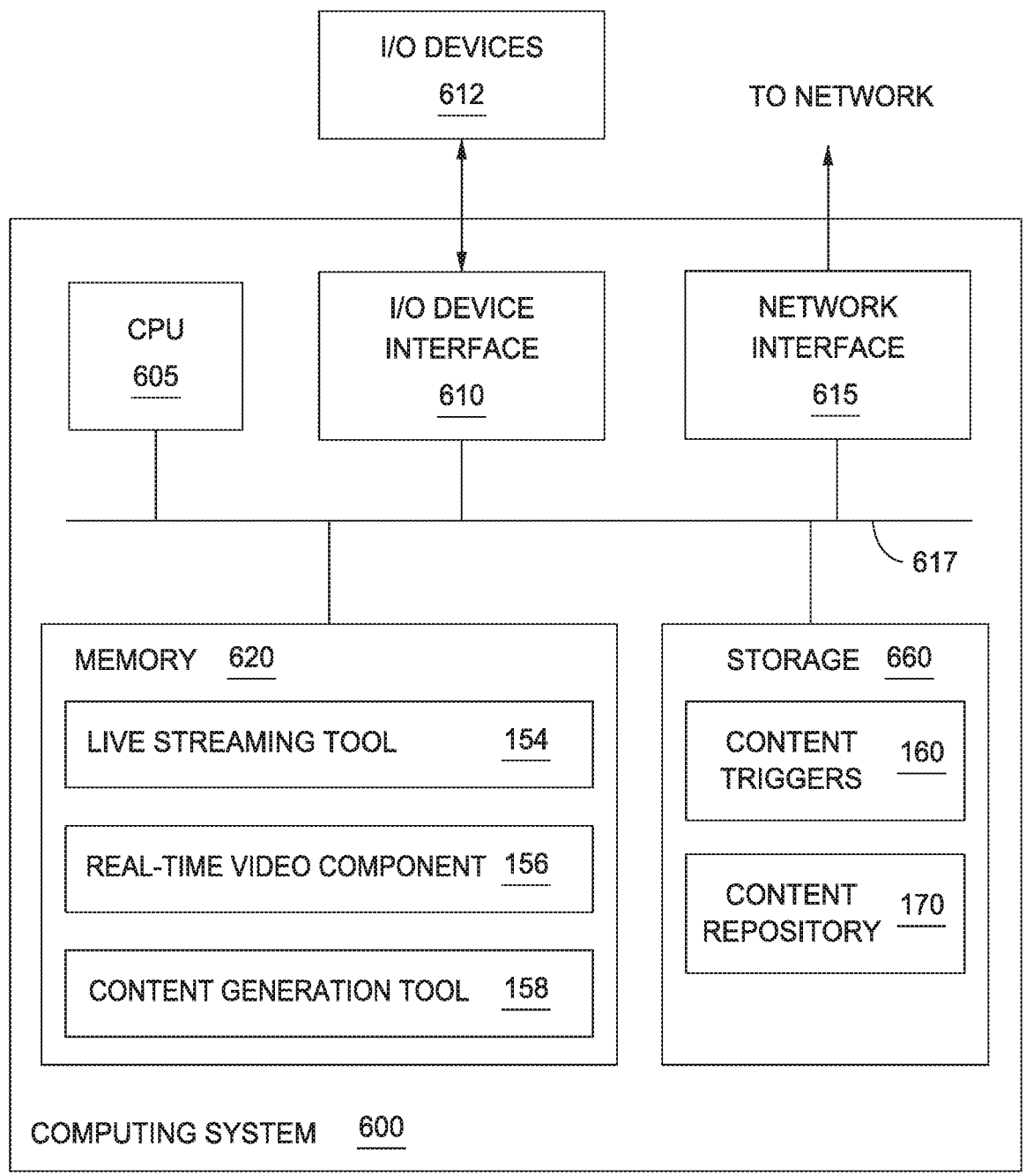
FIG. 6 is a block diagram illustrating a computing system configured to stream video content, according to one embodiment.

FIG. 6 illustrates a computing system 600 configured to stream video content to one or more computing devices, according to one embodiment. As shown, the computing system 600 includes, without limitation, a central processing unit (CPU) 605, a network interface 615, a memory 620, and storage 660, each connected to a bus 617. The computing system 600 may also include an I/O device interface 610 connecting I/O devices 612 (e.g., keyboard, mouse, and display devices) to the computing system 600. Further, in context of this disclosure, the computing elements shown in the computing system 600 may correspond to a physical computing system (e.g., a system in a data center) or may be a virtual computing instance executing within a computing cloud. In one embodiment, the computing system 600 can be an example of the computing system illustrated in FIG. 1 (e.g., computing system 152).

The CPU 605 retrieves and executes programming instructions stored in the memory 620 as well as stores and retrieves application data residing in the memory 620. The interconnect 617 is used to transmit programming instructions and application data between CPU 605, I/O devices interface 610, storage 660, network interface 615, and memory 620. Note CPU 605 is included to be representative of a single CPU, multiple CPUs, a single CPU having multiple processing cores, and the like. Memory 620 is generally included to be representative of a random access memory. The storage 660 may be a disk drive storage device. Although shown as a single unit, storage 660 may be a combination of fixed and/or removable storage devices, such as fixed disc drives, removable memory cards, or optical storage, network attached storage (NAS), or a storage area-network (SAN). The storage 660 includes content triggers 160 and content repository 170, both of which are described in more detail above. Illustratively, the memory 620 includes the live streaming tool 154, real-time video component 156, and content generation tool 158, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the live streaming tool 154, the real-time video component 156, and the content generation tool 158) or related data (e.g., content triggers 160, content repository 170) available in the cloud. For example, the live streaming tool 154 could execute on a computing system in the cloud and could stream first video content to one or more computing devices. In such a case, the real-time video component 156 could monitor the first video content being streamed to the computing device(s) for a content trigger and, after detecting the content trigger, determine second video content corresponding to the content trigger. The content generation tool 158 could fetch the second video content and provide the second video content to the live streaming tool 154. The live streaming tool 154 could subsequently stream the second video content to the computing device(s). Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   receiving, by a first computing device, a sequence of frames of a first video stream, wherein the first video stream is live streaming;
   sending, by the first computing device before a first time instance, a first frame of the sequence of frames of the first video stream to one or more second computing devices;
   performing, by the first computer and before the first time instance, in-frame analysis on a third frame in the sequence of frames of the first video stream, wherein the third frame is a predetermined number of frames before a second frame in the sequence of frames of the first video stream;
   detecting, by the first computing device at a first time instance, using in-frame analysis, a presence of a trigger item within the second frame of the sequence of frames of the first video stream, wherein the trigger item includes a matrix barcode recorded in the first video stream, wherein the matrix barcode comprises a physical object;
   determining, by the first computing device, a second video stream, based on the trigger item;
   sending, in response to detecting the trigger item and by the first computing device at a second time instance subsequent to the first time instance, the second video stream to the one or more second computing devices, wherein the second video stream replaces (i) the second frame, including the trigger item, in the first video stream and (ii) one or more intermediate frames between the first frame and the second frame in the first video stream; and
   after sending the second video stream, begin sending again the sequence of frames of the first video stream to the one or more second computing devices beginning with a fourth frame that occurs after the second frame.

2. The computer-implemented method of claim 1, further comprising, in response to detecting the presence of the trigger item, triggering adjustment of one or more playback settings of the first video stream on the one or more second computing devices.

3. The computer-implemented method of claim 1, wherein:
   the trigger item is one of a plurality of trigger items; and
   each of the plurality of trigger items is associated with at least one of the following: (i) a duration of a video content; (ii) a video content source; and (iii) a position of the video content.

4. The computer-implemented method of claim 1, further comprising:
   determining, in response to detecting the presence of the trigger item, a type of video content associated with the trigger item; and
   selecting video content having the type of video content for the second video stream.

5. The computer-implemented method of claim 1, further comprising:
   determining, in response to detecting the presence of the trigger item, a video content source associated with the trigger item; and
   receiving the second video stream from the video content source.

6. The computer-implemented method of claim 1, further comprising:
   determining, in response to detecting the presence of the trigger item, a time interval associated with the trigger item; and
   determining the second time instance at which to send the second video stream, based on the time interval.

7. The computer-implemented method of claim 1, further comprising buffering, by the first computing device, a subset of the sequence of frames of the first video stream, wherein, at the first time instance, the subset comprises the first frame and the second frame.

8. A system, comprising:
   a processor; and
   a memory storing one or more applications, which, when executed on the processor, perform an operation comprising:
      receiving a sequence of frames of a first video stream, wherein the first video stream is live streaming;
      sending, before a first time instance, a first frame of the sequence of frames of the first video stream to one or more first computing devices;
      performing, by the first computer and before the first time instance, in-frame analysis on a third frame in the sequence of frames of the first video stream, wherein the third frame is a predetermined number of frames before a second frame in the sequence of frames of the first video stream;
      detecting, at a first time instance, using in-frame analysis, a presence of a trigger item within the second frame of the sequence of frames of the first video stream, wherein the trigger item includes a matrix barcode recorded in the first video stream, wherein the matrix barcode comprises a physical object;
      determining a second video stream, based on the trigger item; and
      sending, in response to detecting the trigger item and at a second time instance subsequent to the first time instance, the second video stream to the one or more first computing devices, wherein the second video stream replaces (i) the second frame, including the trigger item, in the first video stream and (ii) one or more intermediate frames between the first frame and the second frame in the first video stream; and
      after sending the second video stream, begin sending again the sequence of frames of the first video stream to the one or more second computing devices beginning with a fourth frame that occurs after the second frame.

9. The system of claim 8, the operation further comprising, in response to detecting the presence of the trigger item, triggering adjustment of one or more playback settings of the first video stream on the one or more first computing devices.

10. The system of claim 8, wherein:
the trigger item is one of a plurality of trigger items; and
each of the plurality of trigger items is associated with at least one of: (i) a duration of a video content; (ii) a video content source; and (iii) a position of the video content.

11. The system of claim 8, the operation further comprising:
determining, in response to detecting the presence of the trigger item, a type of video content associated with the trigger item; and
selecting video content having the type of video content for the second video stream.

12. The system of claim 8, the operation further comprising:
determining, in response to detecting the presence of the trigger item, a video content source associated with the trigger item; and
receiving the second video stream from the video content source.

13. The system of claim 8, the operation further comprising:
determining, in response to detecting the presence of the trigger item, a time interval associated with the trigger item; and
determining the second time instance at which to send the second video stream, based on the time interval.

14. The system of claim 8, the operation further comprising buffering a subset of the sequence of frames of the first video stream, wherein, at the first time instance, the subset comprises the first frame and the second frame.

15. A computer-implemented method by a first computing device, comprising:
receiving a sequence of frames of a live recording of a first video stream, wherein the first video stream is a live streaming;
sending, before a first time instance, a first frame of the sequence of frames of the live recording of the first video stream to one or more second computing devices;
performing, by the first computer and before the first time instance, in-frame analysis on a third frame in the sequence of frames of the first video stream, wherein the third frame is a predetermined number of frames before a second frame in the sequence of frames of the first video stream;
detecting, at a first time instance, using in-frame analysis, a presence of a trigger item within the second frame of the sequence of frames of the live recording of the first video stream, wherein the trigger item includes a matrix barcode recorded in the first video stream, wherein the matrix barcode comprises a physical object;
determining a second video stream, comprising video advertising content, based on the trigger item; and
sending, in response to detecting the trigger item and at a second time instance subsequent to the first time instance, the second video stream to the one or more second computing devices, wherein the second video stream replaces i) the second frame, including the trigger item, in the first video stream and (ii) one or more intermediate frames between the first frame and the second frame in the first video stream; and
after sending the second video stream, begin sending again the sequence of frames of the first video stream to the one or more second computing devices beginning with a fourth frame that occurs after the second frame.

16. The computer-implemented method of claim 15, wherein the trigger item is further associated with at least one of: (i) a duration of the video advertising content, (ii) a video content source, and (iii) a position of the video content.

17. The computer-implemented method of claim 16, further comprising:
determining, in response to detecting the presence of the trigger item, the video content source associated with trigger item; and
receiving the video advertising content from the video content source.

18. The computer-implemented method of claim 15, further comprising, in response to detecting the trigger item, triggering adjustment of one or more playback settings of the live recording of the first video stream on the one or more second computing devices.

* * * * *